E. & W. DIXON.
Buffing-Wheels.
No. 145,492.  Patented Dec. 16, 1873.
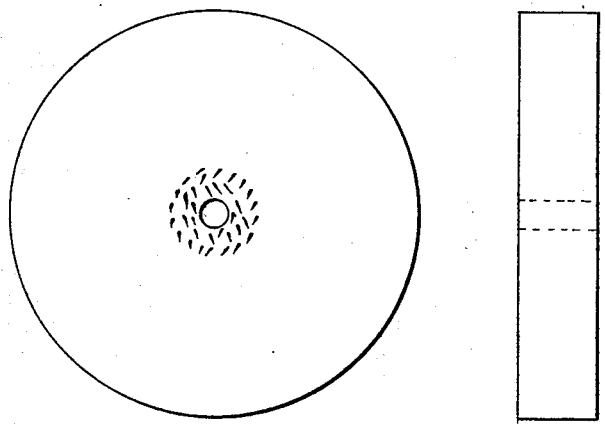

UNITED STATES PATENT OFFICE.

EDWARD DIXON AND WILLIAM DIXON, OF NEWARK, NEW JERSEY.

IMPROVEMENT IN BUFFING-WHEELS.

Specification forming part of Letters Patent No. 145,492, dated December 16, 1873; application filed September 10, 1873.

*To all whom it may concern:*

Be it known that we, EDWARD DIXON and WILLIAM DIXON, of Newark, in the county of Essex and State of New Jersey, have invented certain Improvements in Polishing-Wheels, of which the following is a specification:

Our invention consists in the mode of manufacturing polishing-wheels, a, so that the center shall be firm and durable in use without a separate center applied.

Our mode of construction consists in cutting out the wheel of felt, or other equivalent material, with the hole b, and then of saturating the center with a liquid cement, which runs out from the center for a half-inch, more or less. When the cement dries, it hardens and forms a solid and durable center or boxing, and may be used on a mandrel or screw longer than centers made of other separate materials; and the expense of manufacturing wheels in this way is far less, and this, in the large quantity used, is an important item. Besides, these wheels are better than those with an added center in another respect. Those are pliable up to their connection with the wood center, and then are solid, while the cement used in making our centers runs out into the felt less and less toward the outer edge of the wheel, and serves as a spring, making the wheel more elastic and serviceable.

We claim—

The process described of manufacturing buffing-wheels of felt, with the centers made hard by cement, substantially as and for the purposes set forth.

EDWARD DIXON.
WILLIAM DIXON.

Witnesses:
HORACE HARRIS,
JOHN CRAIG.